(12) United States Patent
Murayama et al.

(10) Patent No.: US 9,262,925 B2
(45) Date of Patent: Feb. 16, 2016

(54) VEHICLE DISPLAY APPARATUS

(71) Applicant: HONDA MOTOR CO., LTD., Tokyo (JP)

(72) Inventors: Hisashi Murayama, Asaka (JP); Megumi Nagumo, Kawagoe (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/478,082

(22) Filed: Sep. 5, 2014

(65) Prior Publication Data

US 2015/0070157 A1 Mar. 12, 2015

(30) Foreign Application Priority Data

Sep. 11, 2013 (JP) .................................. 2013-188593

(51) Int. Cl.
*G08G 1/16* (2006.01)
*B60K 35/00* (2006.01)

(52) U.S. Cl.
CPC ................ *G08G 1/167* (2013.01); *B60K 35/00* (2013.01); *B60K 2350/2052* (2013.01); *B60K 2350/2056* (2013.01); *B60K 2350/2065* (2013.01); *B60K 2350/2086* (2013.01)

(58) Field of Classification Search
CPC ................... G08G 1/167; B60K 35/00; B60K 2350/1064; B60K 2350/1084; B60K 2350/2052; B60K 2350/2056; B60K 2350/2065; B60K 2350/2086; G02B 27/01; G02B 27/0101; G02B 2027/014; G02B 2027/0141
USPC ............ 340/435; 345/7, 9; 348/115; 701/301
See application file for complete search history.

(56) References Cited

U.S. PATENT DOCUMENTS

| 5,371,510 A | 12/1994 | Miyauchi et al. | |
|---|---|---|---|
| 2002/0005778 A1* | 1/2002 | Breed | B60Q 9/008 340/435 |
| 2002/0183921 A1* | 12/2002 | Sugiyama | B60K 37/02 359/631 |
| 2002/0186228 A1 | 12/2002 | Kobayashi et al. | |
| 2004/0145457 A1* | 7/2004 | Schofield | B60K 35/00 345/7 |
| 2005/0276447 A1* | 12/2005 | Taniguchi | G06K 9/00362 340/435 |

(Continued)

FOREIGN PATENT DOCUMENTS

| DE | 10225385 | 1/2003 |
|---|---|---|
| JP | 2005-306116 | 11/2005 |

(Continued)

OTHER PUBLICATIONS

Japanese Office Action with English translation dated Aug. 4, 2015, 6 pages.

(Continued)

*Primary Examiner* — Thomas Mullen
(74) *Attorney, Agent, or Firm* — Rankin, Hill & Clark LLP

(57) ABSTRACT

A vehicle display apparatus includes a plurality of display devices that superpose and display a plurality of pieces of information by displaying information at each position of a plurality of different positions in a predetermined direction towards the front of a vehicle that can be viewed by a driver of the vehicle, and includes as at least one of the plurality of display devices, an attention attracting display device that displays as the information, attention attracting information on the nearest side to the driver in the predetermined direction.

3 Claims, 5 Drawing Sheets

(56) References Cited

U.S. PATENT DOCUMENTS

| | | | |
|---|---|---|---|
| 2006/0192660 A1* | 8/2006 | Watanabe | B60R 1/00 340/435 |
| 2007/0120657 A1* | 5/2007 | Schofield | G08G 1/167 340/435 |
| 2008/0158096 A1* | 7/2008 | Breed | B60N 2/002 345/7 |
| 2009/0009314 A1* | 1/2009 | Taniguchi | B60R 1/00 340/461 |
| 2013/0188259 A1 | 7/2013 | Nakamura et al. | |

FOREIGN PATENT DOCUMENTS

| | | |
|---|---|---|
| JP | 2009-292296 | 12/2009 |
| JP | 2010-88045 | 4/2010 |
| JP | 2010-173530 | 8/2010 |

OTHER PUBLICATIONS

German Office Action with English Translation dated Nov. 9, 2015, 26 pages.

* cited by examiner

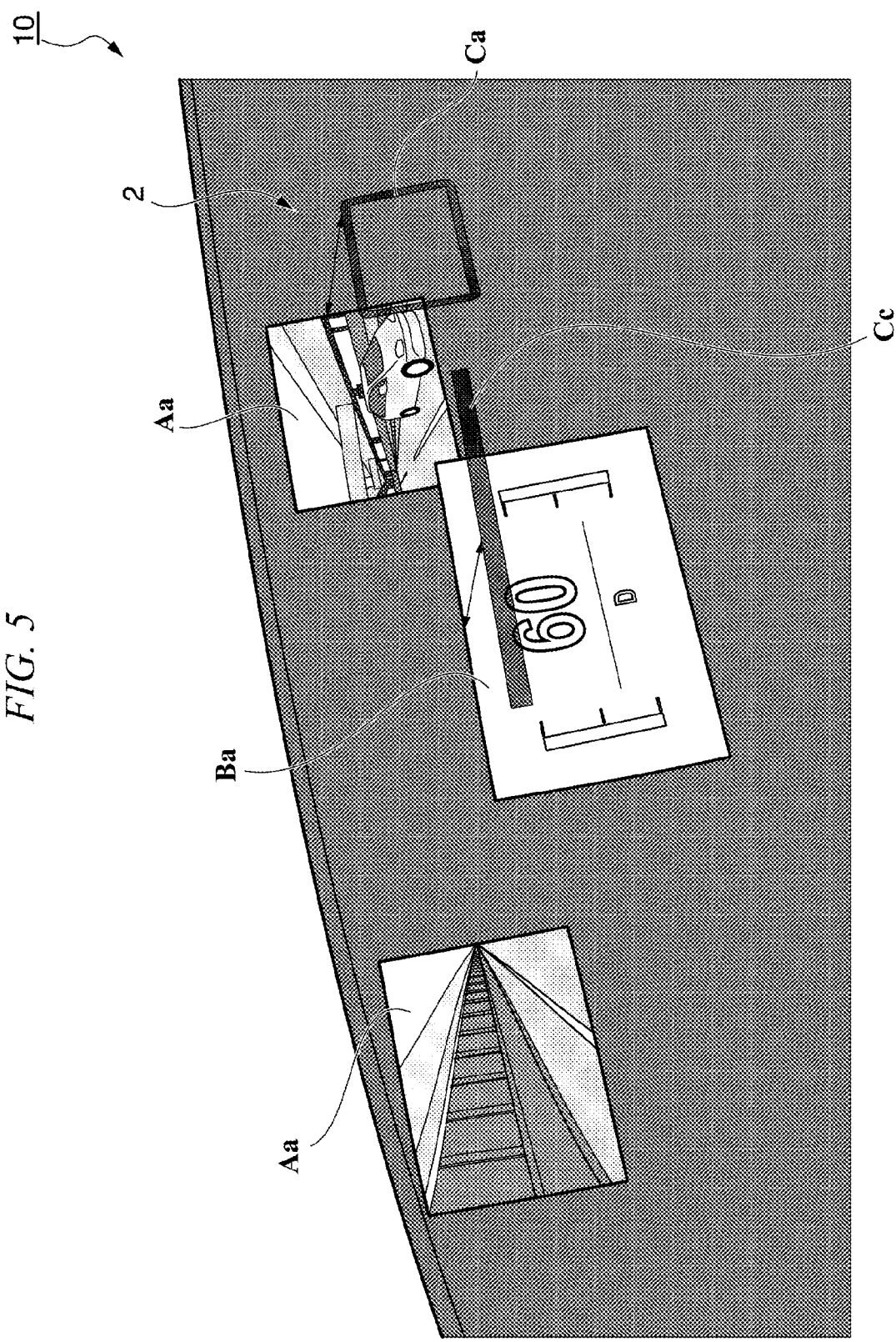

VEHICLE DISPLAY APPARATUS

CROSS-REFERENCE TO RELATED APPLICATION

Priority is claimed on Japanese Patent Application No. 2013-188593, filed Sep. 11, 2013, the content of which is incorporated herein by reference.

BACKGROUND OF THE INVENTION

1. Field of the Invention

The present invention relates to a vehicle display apparatus.

2. Description of Related Art

Conventionally, a night vision system that detects a pedestrian from image data taken by a camera and displays image data in which the pedestrian is surrounded by a rectangular frame on a display device has been known (for example, refer to Japanese Unexamined Patent Application, First Publication No. 2010-88045).

SUMMARY OF THE INVENTION

According to the night vision system of the conventional technique, the rectangular frame is synthesized and drawn in the image data. Therefore there is a problem in that a portion where the rectangular frame is overwritten is shielded by the rectangular frame. Moreover, the size of the rectangular frame is limited to the size of a screen on which the image data is displayed, and the shape of the rectangular frame is limited to a two-dimensional shape on the image data. Therefore there is a problem in that it is difficult to diversify a display format in order to attract attention.

Aspects according to the present invention take into consideration the above situation, with an aim of providing a vehicle display apparatus that can effectively attract a driver's attention.

In order to solve the above problems and achieve the object, the present invention has adopted the following aspects.

(1) A vehicle display apparatus according to a first aspect of the present invention comprises a plurality of display devices that superpose and display a plurality of pieces of information by displaying information at each position of a plurality of different positions in a predetermined direction towards the front of a vehicle that can be viewed by a driver of the vehicle, and comprises as at least one of the plurality of display devices, an attention attracting display device that displays as the information, attention attracting information on the nearest side to the driver in the predetermined direction.

(2) In the aspect of (1) above, the vehicle display apparatus may comprise as any one of the plurality of display devices, a captured image display device that displays as the information, a captured image output from an image pickup device that captures an image of the surroundings of the vehicle, and the attention attracting display device may display the attention attracting information with respect to an obstacle of the vehicle present in the captured image displayed by the captured image display device.

(3) In the aspect of (2) above, the attention attracting display device may display as the attention attracting information, a frame image that is visible by the driver so as to surround the obstacle of the vehicle, and the size and position of the frame image may be changed according to the size and position of the obstacle of the vehicle in the captured image.

According to the vehicle display apparatus in the aspect described in (1) above, the attention attracting information is displayed on the nearest side to the driver when the plurality of pieces of information are superposed and displayed. Therefore, the attention attracting information is highlighted so as to stereoscopically emerge on the nearer side to the driver than the attention attracting object. As a result, the attention attracting information can be recognized by the driver more easily as compared to a case in which flat highlighting is performed, for example, by color and shading, thereby enabling to attract attention effectively.

In the case of (2) above, the attention attracting information is displayed on the nearer side to the driver than the obstacle of the vehicle. Therefore attention can be effectively attracted to the obstacle of the vehicle. Moreover, a situation where the information in the captured image such as the attention attracting object (an obstacle of the vehicle or the like) is completely concealed by the attention attracting information can be prevented, as compared to a case in which the attention attracting information is drawn in the captured image itself. That is to say, the attention attracting information is superposed and displayed at a position on the nearer side to the driver than the captured image, and hence all the pieces of information in the captured image can be recognized by binocular parallax of the driver.

In the case of (3) above, by changing the frame image for attracting attention according to the size and position of the obstacle in the captured image, that is to say, according to a change of a relative moving state and a relative position of the obstacle with respect to the vehicle, attention can be attracted more effectively.

BRIEF DESCRIPTION OF THE DRAWINGS

FIG. 5 is a diagram showing a display example of the vehicle display apparatus according to a modification example of the embodiment of the present invention.

DETAILED DESCRIPTION OF THE INVENTION

Hereunder, a vehicle display apparatus according to an embodiment of the present invention will be described with reference to the accompanying drawings.

Figure 1:
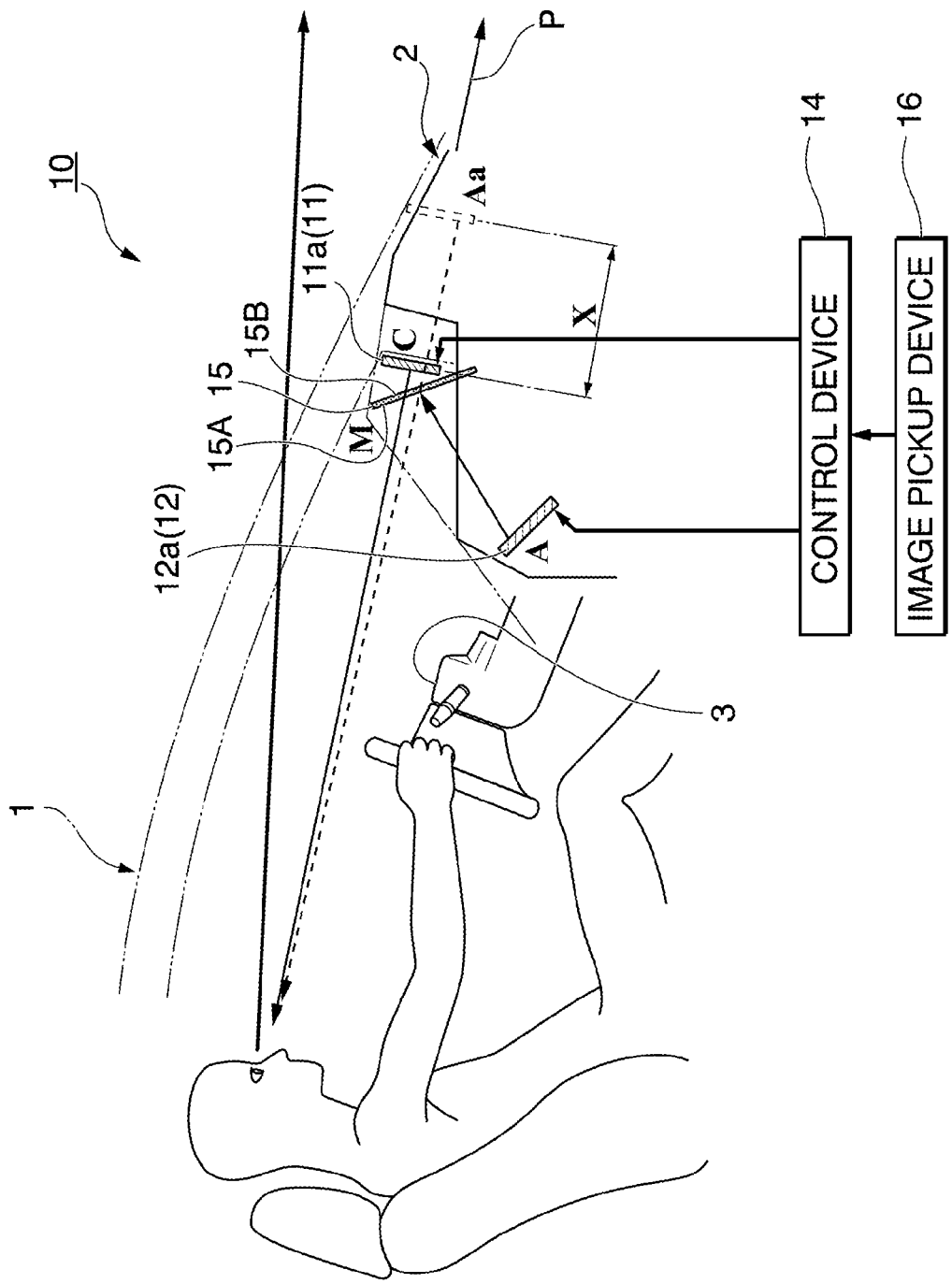
FIG. 1 is a configuration diagram of a vehicle display apparatus according to an embodiment of the present invention, being a diagram showing a position of a first virtual image visible by a driver.
Figure 2:
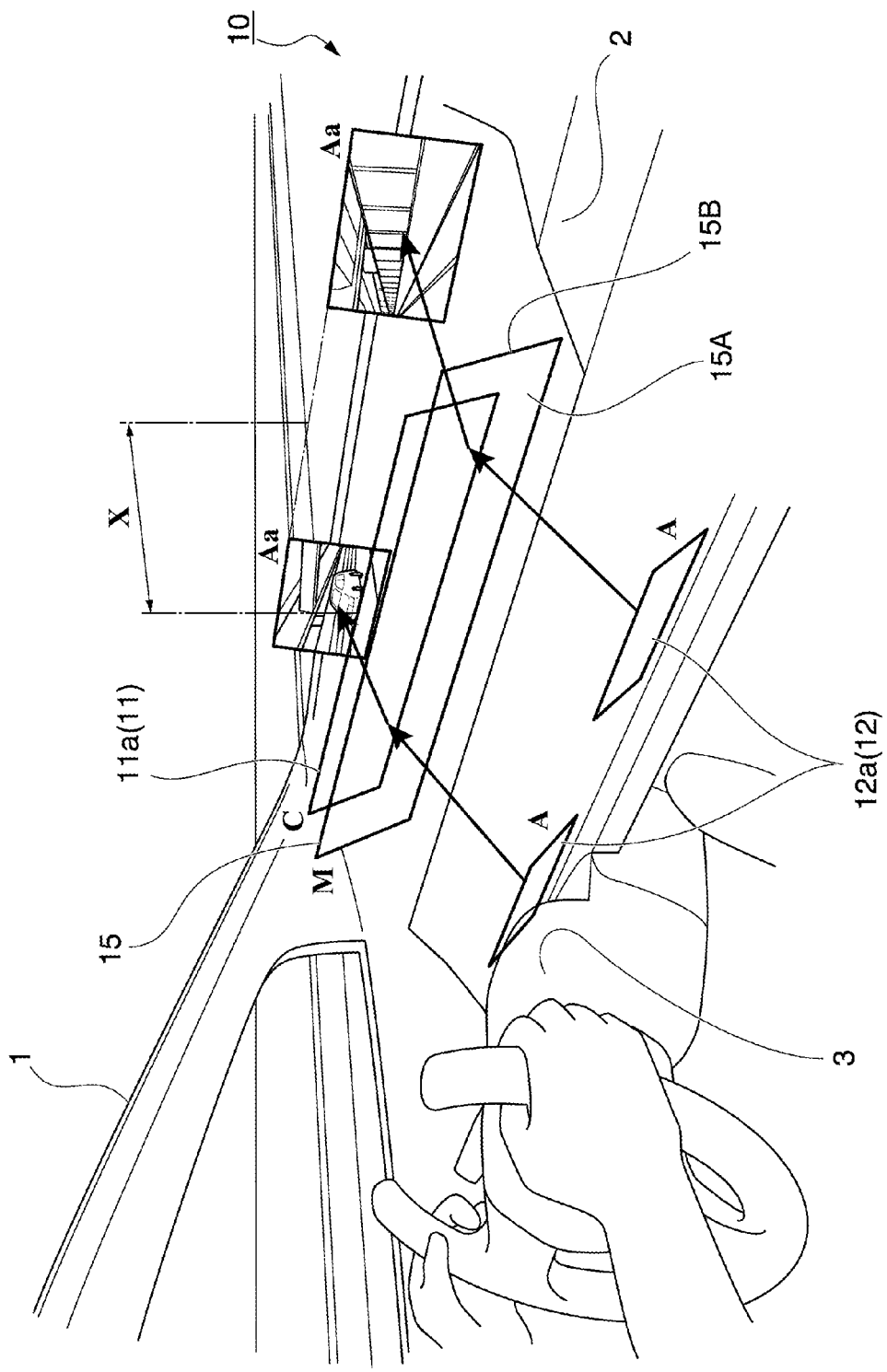
FIG. 2 is a perspective view of the vehicle display apparatus according to the embodiment of the present invention, being a diagram showing the position of the first virtual image visible by the driver.

As shown in FIG. 1 and FIG. 2, a vehicle display apparatus 10 according to the present embodiment is installed on an instrument panel 2 provided at the front of a driver's seat (not shown) of a vehicle 1. The vehicle display apparatus 10 comprises a real image display device (display device, attention attracting display device) 11, a virtual image display device (display device, captured image display device) 12, and a control device 14.

The real image display device 11 comprises a liquid crystal display (C) 11*a,* made for example by a TFT (thin film transistor) liquid crystal. The liquid crystal display (C) 11*a* is arranged so as to face the front of the driver at a predetermined position in a predetermined direction P towards the front of the vehicle, visible by the driver seated on the driver's seat. The real image display device 11 displays, for example, attention attracting information, alarm information, information of the vehicle 1, and entertainment information, on the liquid crystal display (C) 11a.

The liquid crystal display (C) 11a is constituted by liquid crystal with a background being not see-through (that is, non-transmissive) so that, for example, the driver cannot view a portion on the far side as seen from the driver and a light blocking effect with respect to a display region is ensured.

The TFT liquid crystal may be liquid crystal with the background being see-through.

The virtual image display device 12 comprises a mirror member 15 such as a half mirror. The mirror member 15 is arranged at a position on the nearer side to the driver than the liquid crystal display (C) 11a in the predetermined direction P so that the liquid crystal display (C) 11a is positioned behind the mirror member 15 as seen from the driver seated on the driver's seat. The mirror member 15 comprises a surface 15A inclined so that an upper part thereof protrudes further toward the front side of the driver than a lower part thereof. The mirror member 15 reflects light entering from the near side to the driver into the surface 15A, and causes light entering from the far side from the driver into a rear surface 15B to be transmitted toward the near side to the driver.

The virtual image display device 12 comprises a pair of virtual image liquid crystal displays (A, A) 12a and 12a, made for example by a TFT (thin film transistor) liquid crystal. The pair of virtual image liquid crystal displays (A, A) 12a and 12a are arranged at positions substantially line-symmetric widthwise, about a steering column 3 so that a display image can be projected on the surface 15A of the mirror member 15. The pair of virtual image liquid crystal displays (A, A) 12a and 12a are arranged so that the respective display images are reflected toward a position of the eyes of the driver seated on the driver's seat, by the surface 15A of the mirror member 15 and are visible by the driver as respective virtual images Aa at a pair of left and right virtual image display positions set behind the liquid crystal display (C) 11a with a distance X, as seen from the driver.

The virtual image display device 12 displays, for example, captured images or the like output from an image pickup device 16 that captures an image of the surroundings of the vehicle 1 (for example, an external region on a rear side of the vehicle visible by the driver by means of door mirrors (not shown) of the vehicle 1) on each of the pair of virtual image liquid crystal displays (A, A) 12a and 12a.

The pair of left and right virtual images Aa at the pair of left and right virtual image display positions as seen from the driver, are arranged away from each other with a predetermined interval in the widthwise direction of the vehicle 1.

That is to say, the captured image of the surroundings is generated as a virtual image by the minor member 15 arranged on the nearer side than the liquid crystal display (C) 11a. Therefore it is set such that an alarm display or the like of the liquid crystal display (C) 11a can be seen on the nearer side than the captured image of the surroundings, and such that the captured image of the surroundings can be seen through the alarm display.

The control device 14 controls respective displays of the real image display device 11 and the virtual image display device 12.

Moreover, the control device 14 controls image pickup of the image pickup device 16.

The vehicle display apparatus 10 according to the present embodiment comprises the above configuration. Next is a description of a display example by a display operation of the vehicle display apparatus 10.

Figure 3:
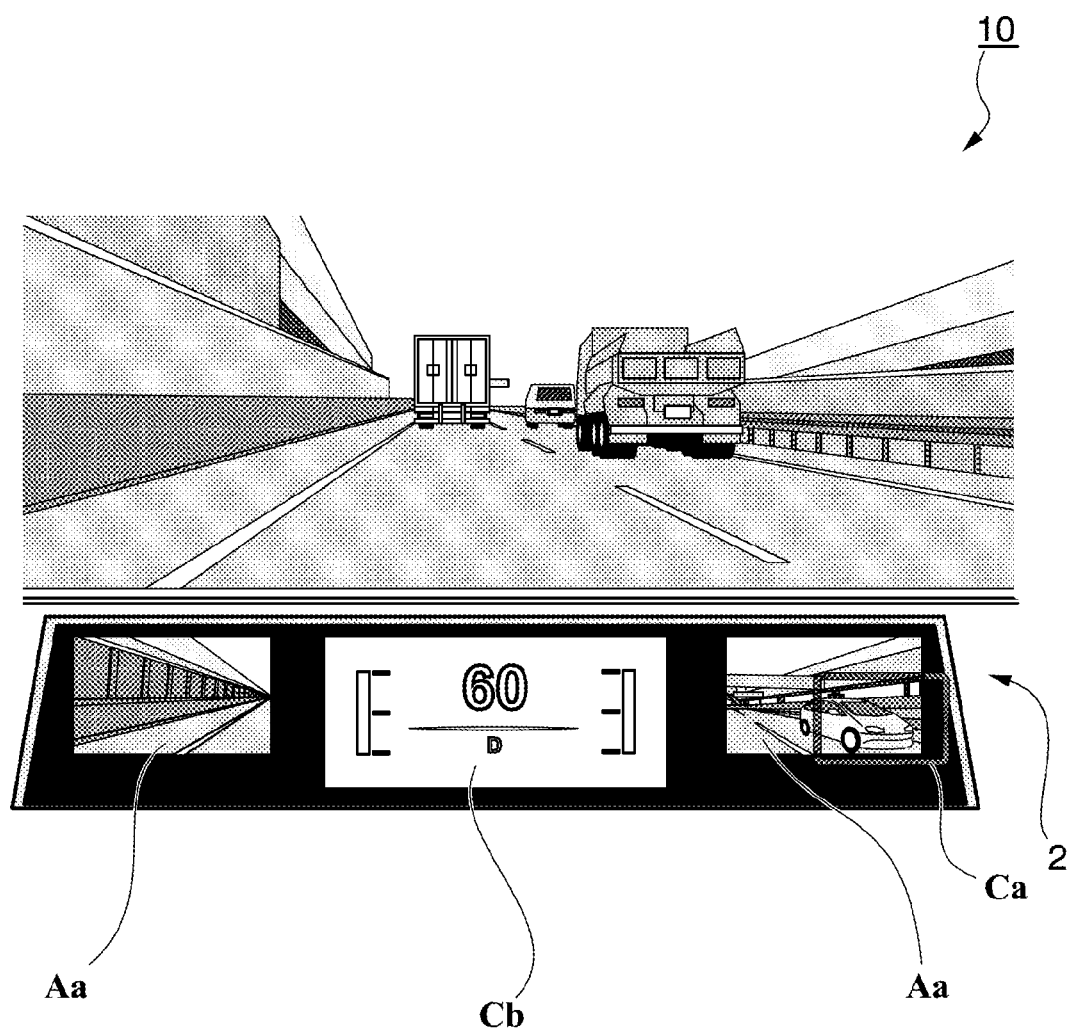
FIG. 3 is a diagram showing a display example of the vehicle display apparatus according to the embodiment of the present invention.

For example, when another vehicle approaches the traveling vehicle 1 so as to pass the vehicle 1 from behind, then as shown in FIG. 3, the virtual image display device 12 displays the captured image of left and right rear sides of the vehicle 1 output from the image pickup device 16 at a pair of left and right virtual image display positions as the pair of left and right virtual images Aa and Aa. The real image display device 11 displays a frame image Ca visible by the driver superposed with an obstacle in the respective virtual images Aa, as attention attracting information with respect to the obstacle of the vehicle 1 present in the captured image output from the image pickup device 16. As a result, the real image display device 11 and the virtual image display device 12 stereoscopically superpose and display the frame image Ca and the virtual image Aa in the predetermined direction P.

Moreover, the real image display device 11 displays pieces of information Cb of the vehicle 1 such as the speed of the vehicle 1, the fuel level, and the engine water temperature meter, between the pair of left and right virtual images Aa and Aa in the widthwise direction of the vehicle 1, in addition to the frame image Ca.

Figure 4:
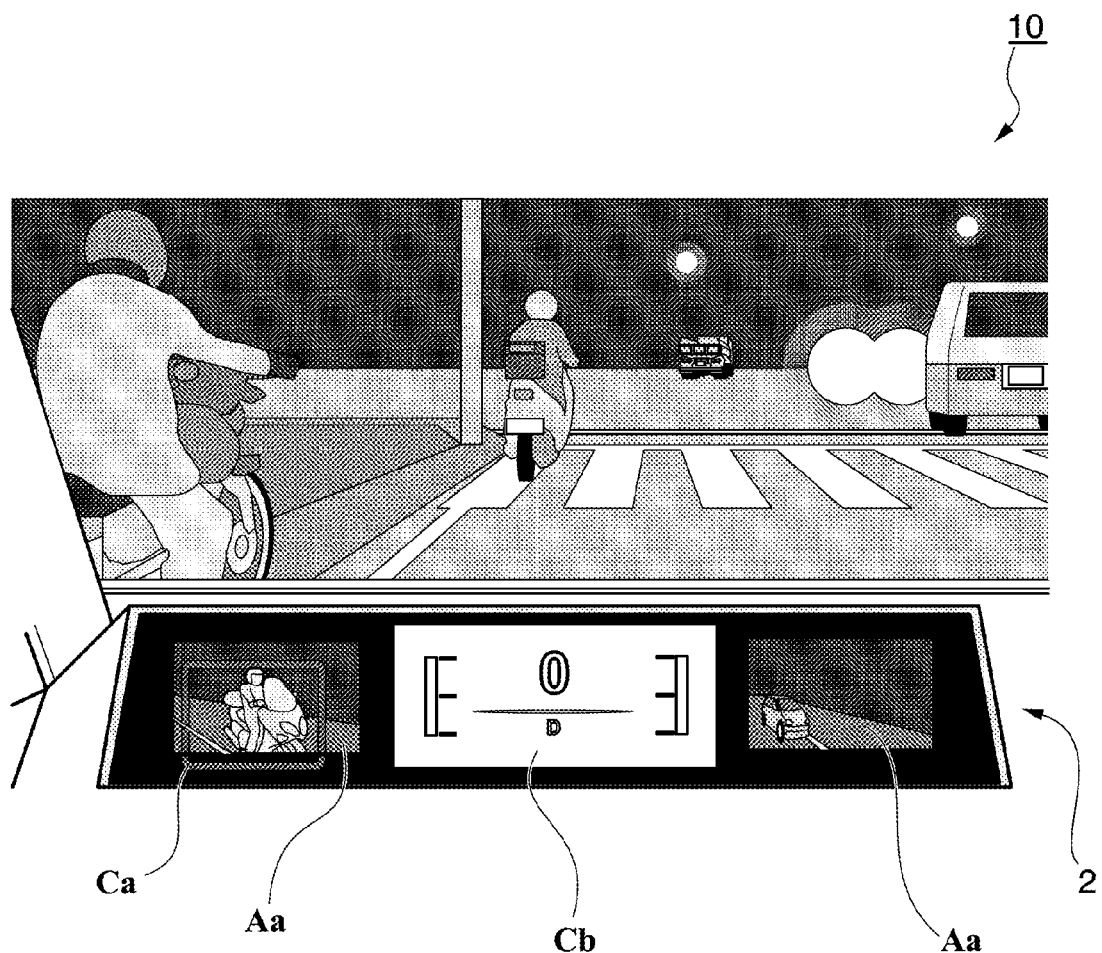
FIG. 4 is a diagram showing a display example of the vehicle display apparatus according to the embodiment of the present invention.

For example, when another vehicle approaches the parked vehicle 1 so as to pass the vehicle 1 from behind, then as shown in FIG. 4, the virtual image display device 12 displays the captured image of left and right rear sides of the vehicle 1 output from the image pickup device 16, at a pair of left and right virtual image display positions as the pair of left and right virtual images Aa and Aa. The real image display device 11 displays a frame image Ca visible by the driver superposed with an obstacle in the respective virtual images Aa, as attention attracting information with respect to the obstacle of the vehicle 1 present in the captured image output from the image pickup device 16. As a result, the real image display device 11 and the virtual image display device 12 stereoscopically superpose and display the frame image Ca and the virtual image Aa in the predetermined direction P.

The virtual image display device 12 can change a display mode of the attention attracting information such as the frame image Ca, according to an attention attracting degree, the urgency, a change in size and position of the obstacle in the captured image, and the like. For example, the virtual image display device 12 may change the emerging condition of the frame image Ca to have an emphasis tendency by displaying the frame image Ca so as to run off the edge of the captured image and become larger, as the urgency of attention attracting increases.

When displaying the information Cb of the vehicle 1 such as the speed of the vehicle 1, the fuel level, and the engine water temperature meter, between the pair of left and right virtual images Aa and Aa in the widthwise direction of the vehicle 1, in addition to the frame image Ca, the real image display device 11 may decrease display brightness as compared to the brightness when the vehicle 1 is traveling.

As described above, according to the vehicle display apparatus 10 according to the present embodiment, the attention attracting information is displayed on the nearest side to the driver at the time of superposing and displaying a plurality of pieces of information. Therefore the attention attracting information is highlighted so as to stereoscopically emerge on the nearer side to the driver than the attention attracting object such as the obstacle of the vehicle 1 in the captured image. As a result, the attention attracting information can be recognized more easily by the driver as compared to a case in which flat highlighting is performed, for example, by color and shading, thereby enabling to attract attention effectively even if the driver does not look at the attention attracting object.

Moreover, flexibility of the display mode of the attention attracting information (for example, the emerging condition, a position to be superposed on the attention attracting object, and the highlighting condition) can be increased, as compared to a case in which the attention attracting information is drawn in the captured image itself. Furthermore, it can be prevented that information in the captured image is completely hidden by the attention attracting information, and all the pieces of information in the captured image can be recognized by binocular parallax of the driver.

Moreover, by changing the display mode of the frame image for attention attracting according to the attention attracting degree, the urgency, or the size and position of the obstacle in the captured image, that is to say, according to a change of relative moving state and relative position of the obstacle with respect to the vehicle 1, attention can be attracted more effectively.

In the above-described embodiment, further, another virtual image display device that can display a virtual image at a position different from a virtual image display position by the virtual image display device 12 in the predetermined direction P can be provided.

In this modification example, the real image display device 11 needs only to be able to display the attention attracting information superposed and visible on each virtual image.

For example, as shown in FIG. 5, when a virtual image Ba is displayed behind the liquid crystal display (C) 11a (for example, a position on the nearer side to the driver than the virtual image display position by the virtual image display device 12) in the predetermined direction P by another virtual image display device, the real image display device 11 displays the frame image Ca superposed and visible on the obstacle in the virtual image Aa, and an attention-attracting image Cc superposed and visible on the virtual image Ba.

In the above-described embodiment, a real image and a virtual image are superposed and displayed. However, the display is not limited thereto, and for example, when there is a space where a plurality of liquid crystal displays can be installed in the predetermined direction P, a plurality of real images to be displayed at different positions may be superposed and displayed by a plurality of real image display devices. Moreover, for example, when the space required for installation of a device in the predetermined direction P is to be reduced, a plurality of virtual images to be displayed at different positions can be superposed and displayed by a plurality of virtual image display devices. In any case, the attention attracting information needs only to be displayed on the nearest side to the driver by the virtual image or the real image.

As described above, the present embodiment shows only an example in implementing the present invention, and it is a matter of course that the present invention should not be interpreted as being limited to the embodiment described above.

What is claimed is:

1. A vehicle display apparatus
   comprising a plurality of display devices that superpose and display a plurality of pieces of information by displaying information at each position of a plurality of different positions in a predetermined direction towards the front of a vehicle that can be viewed by a driver of the vehicle,
   and comprising as at least one of the plurality of display devices, an attention attracting display device that displays as the information, attention attracting information on the nearest side to the driver in the predetermined direction.

2. The vehicle display apparatus according to claim 1,
   comprising as any one of the plurality of display devices, a captured image display device that displays as the information, a captured image output from an image pickup device that captures an image of the surroundings of the vehicle,
   and the attention attracting display device displays the attention attracting information which attracts attention with respect to an obstacle of the vehicle present in the captured image displayed by the captured image display device.

3. The vehicle display apparatus according to claim 2, wherein the attention attracting display device displays as the attention attracting information, a frame image that is visible by the driver so as to surround the obstacle of the vehicle, and changes the size and position of the frame image according to the size and position of the obstacle of the vehicle in the captured image.

* * * * *